United States Patent [19]

Cense et al.

[11] 4,319,276

[45] Mar. 9, 1982

[54] TELEVISION RECEIVER SYNCHRONIZING ARRANGEMENT

[75] Inventors: Adriaan Cense, Nijmegen, Netherlands; Maurice C. Gander; Donald G. Thompson, both of Mitcham, England

[73] Assignee: U.S. Philips Corporation, New York, N.Y.

[21] Appl. No.: 141,516

[22] Filed: Apr. 18, 1980

[30] Foreign Application Priority Data

May 4, 1979 [GB] United Kingdom ............... 15685/79

[51] Int. Cl.³ .............................................. H04N 5/04
[52] U.S. Cl. ................................................ 358/158
[58] Field of Search .......................... 358/158, 148

[56] References Cited

U.S. PATENT DOCUMENTS 4,122,488 10/1978 Mikado ............................... 358/158

Primary Examiner—Richard Murray
Attorney, Agent, or Firm—Thomas A. Briody; William J. Streeter; Laurence A. Wright

[57] ABSTRACT

A television receiver including a synchronizing arrangement for providing line and field drive pulses for line and field output stages, which synchronizing arrangement comprises a line oscillator control circuit for controlling the frequency and/or phase of a line oscillator the output signal of which is divided by a divider circuit to produce pulses of field frequency. The divider pulses are applied to a field coincidence stage together with received field synchronizing pulses where their phases are compared and the number of times there is coincidence is counted by a counter and to a controllable switch which also receives field synchronizing pulses from a field oscillator which is driven by received field synchronizing pulses. A mode selection circuit controls the operation of switch which switch is driven into an internal synchronization mode when coincidence is present in the field coincidence stage for a given period, in which mode divider pulses drive the field output stage, and into an external synchronization mode when the above coincidence is not present, in which mode pulses from the field oscillator drive the field output stage. In order to prevent a black bar appearing for a finite period on the display tube of the receiving when changing television channel or the camera is changed in the studio the line oscillator control circuit produces an output which output drives the switch from the internal to the external synchronization mode.

10 Claims, 1 Drawing Figure

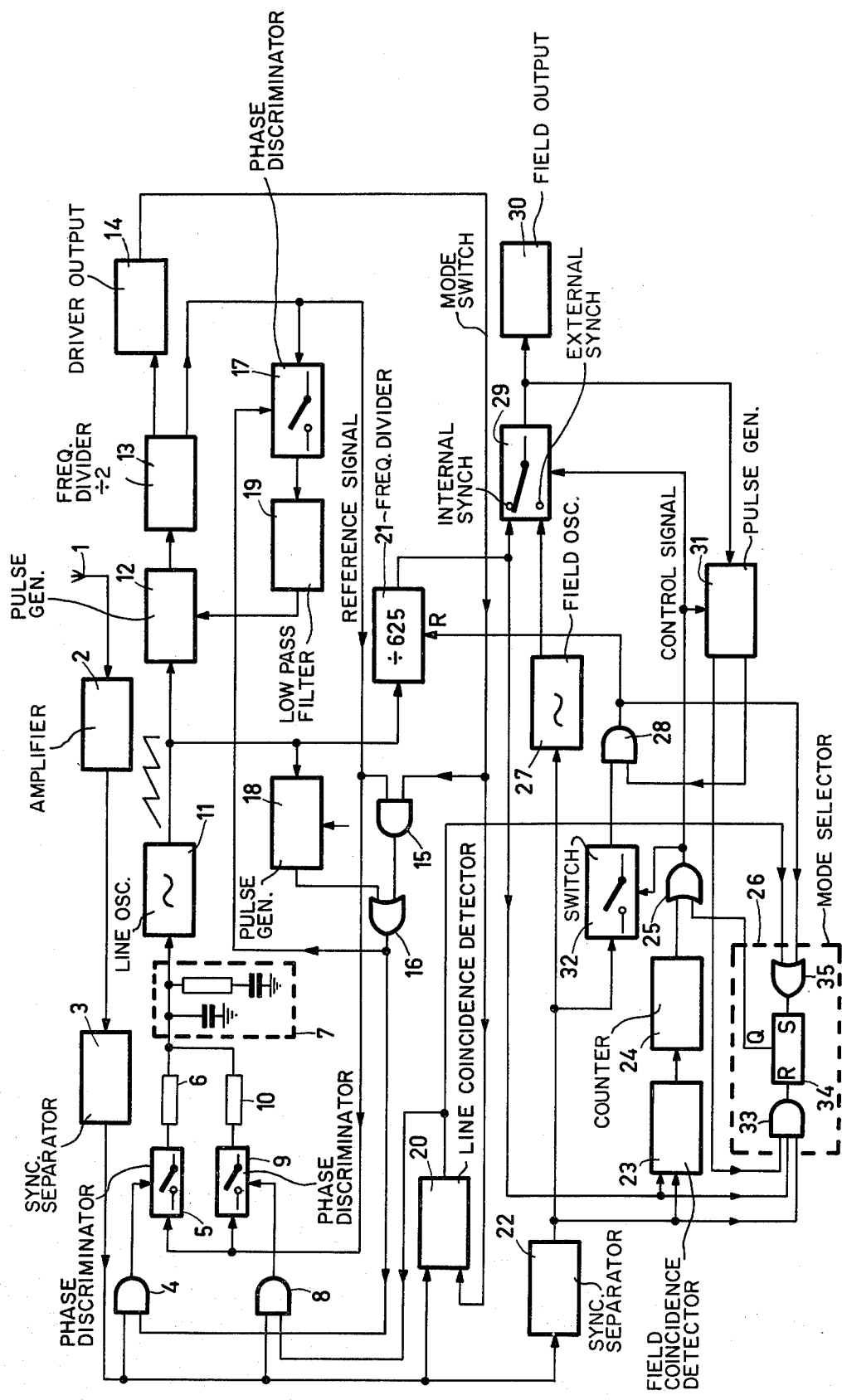

TELEVISION RECEIVER SYNCHRONIZING ARRANGEMENT

The invention relates to a television receiver suitable for the reception of a television signal incorporating line and field synchronizing pulses wherein a plurality of fields constitutes an image. The receiver includes a synchronizing arrangement which comprises a line oscillator for generating in the synchronized condition thereof a signal having a frequency equal to the line frequency or to an integral multiple thereof. Means are available for applying received line synchronizing pulses and a reference signal derived from the line oscillator signal and the line synchronizing signal to a line oscillator control circuit which circuit is adapted to produce a control signal depending on the phase relationship between the line synchronizing pulses and the reference signal for controlling the frequency and/or phase of said line oscillator. A frequency divider circuit is connected to the line oscillator for producing pulses of field frequency from the line oscillator signal. Other means are available for applying received field synchronizing pulses and pulses produced by the frequency divider circuit to a field comparison stage for comparing the phase of the received pulses with that of the divider pulses. Means are provided for determining the time during which a given phase relationship does not exist in said comparison stage between the pulses compared therein further means are provided for applying received field synchronizing pulses to the frequency divider circuit for the resetting thereof. A field synchronization control stage is connected to a field deflection output stage, the control stage being switchable between an external synchronization operating mode in which it is adapted to apply in operation the received field synchronization pulses or a signal derived therefrom to the field output stage and an internal synchronization operating mode in which it is adapted to apply in operation the divider pulses to the field output stage. The field control stage is adapted to be switched from the external to the internal synchronization mode when the given phase relationship in said field comparison stage has existed for a predetermined period while the field control stage is adapted to be switched from the internal to the external synchronization mode when the given phase relationship has not existed for the predetermined period. A received field synchronizing pulse is then allowed to be applied to the frequency divider circuit for the resetting thereof.

In such television receivers it is ensured due to the frequency division that the divider pulses always have the field frequency as soon as the line oscillator is in its synchronized condition, which is generally effected fairly quickly after switching on of the receiver or after an out-of-synchronization condition having occurred for some reason. The correct phase of the field frequency pulses applied to the field output stage relative to that of the field synchronizing pulses originating from a transmitter and received by the television receiver is ensured by the comparison stage which may be formed as a coincidence gate, and the associated means for determining the time may be formed as an integrator or as a counter. When the signals applied to the comparison stage have the given phase relationship the mode of operation, called above internal synchronization mode, is such that the divider pulses are applied to the field output stage to be processed therein for the purpose of the field (vertical) deflection, the external synchronizing pulses not being able to reach the frequency divide circuit and being used solely for comparison. In the internal synchronization mode, therefore, external interference and noise cannot disturb the operation of the field synchronization circuit arrangement.

When the signals applied to the comparison stage do not have the given phase relationship the external synchronizing signal should be allowed to reach the divider which may be formed as a counter, for resetting it and to be applied possibly through a pulse shaping circuit, for example a synchronizable oscillator, to the field output stage, this phase condition being established in the comparison stage. This phase condition occurs immediately after switching on of the receiver or when the given phase relationship condition has been lost for some reason, for example because of interference. After the divider has been reset by the receiver field synchronizing signal the divider pulses return to the correct phasing. The given phase relationship will now be established with the consequence that the control stage will be able to be switched from the external to the internal sychronization mode. It may, however, be desirable to delay this change over, for example for establishing with certainty the given phase relationship over a number of field periods or for distinguishing normal television transmission signals from other television signals, the latter being signals in which the number of lines per image deviates from the number prescribed in the relevant television system. Our Patent Specification Ser. No. 1,445,456 describes an arrangement in which use is made of gating pulses occurring periodically and in which the change over is delayed until it is ascertained during the occurrence of one gating pulse that the incoming synchronizing pulses are normal pulses whereas in the opposite case the arrangement remains in the external synchronization mode. It will be clear, however, that because of the noise immunity requirements the period of time in which the external synchronization mode prevails before the change over is effected should be made as short as possible.

A single occurrence during the internal synchronization mode of loosing the given phase relationship because, for example, one field synchronizing pulse has been lost due to interference, will not be allowed in many known arrangements to cause immediately the switch to the external synchronization mode. Only when on several consecutive occasions the given phase relationship has been lost will the field synchronization circuit arrangement conclude that the divider has to be reset and that the external synchronization pulses and not the divider pulses have to be conveyed to the output stage. Otherwise, every interference could cause a vertical instability of the displayed picture due to unequal durations of consecutive field periods. Such a delay in switching to the external synchronization mode is therefore a desirable feature, especially after switching on of the receiver when as a rule the in-phase condition has not yet occurred.

However, it may happen that the above-mentioned delay is unduly long. It may namely occur that a new train of synchronizing pulses with the proper frequency is received the first pulse of which does not occur at the expected instant after the last pulse of the preceding train. Such a phase change may take place following a channel change in the receiver or a camera switch over in the transmission studio and results in a lasting loss of the given phase relationship in spite of the fact that a normal synchronizing signal is being received. Most of the field synchronization circuit arrangements based upon the division principle and comprising a comparison stage as referred to in the foregoing will experience a loss of synchronization therein, but since the internal synchronization mode prevailed before the change, there will be no change in the operation before the completion of the above-mentioned delay. This results in an incorrect phase position of the signal applied to the field output stage and hence of the field deflection. A horizontal black bar corresponding to the field blanking pulse is consequently displayed on the screen of the picture tube of the receiver, a part of the image being displayed above the bar while another part is displayed below it and the bar being immobile. Only at the end of the delay does the black bar disappear while the image becomes correct, the field synchronization circuit arrangement having now recognized the new phase position of the received field synchronizing pulses and re-established synchronism.

The phenomenon described above would not be troublesome if its duration was very short. This is however not the case because of interference insensitivity requirements. The Patent Specification referred to above mentions a time interval of 16 field periods, i.e. 0.32 second for a field frequency of 50 Hz. Even if the delay is reduced to 8 periods, i.e. 0.16 second, experience shows that the black bar display described is to be considered as inconvenient.

SUMMARY OF THE INVENTION

It is an object of the invention to reduce the above mentioned delay and to this end the invention provides a television receiver of the type described in the opening paragraph, characterized in that the field control stage is also adapted to be switched from the internal to the external synchronization mode under the control of the line oscillator control circuit when the phase between the line synchronizing pulses and/or a further reference signal also derived from the line oscillator signal departs from a given phase relationship.

With the invention it is recognized that the above-mentioned delay can be substantially reduced when it is detrimental, whereas it can be maintained whenever it is useful because of the required insensitivity to interference and noise. It is further recognised that the field synchronization circuit arrangement can furnish no usable criterion for this purpose and that this information can be obtained as stated from the line oscillator control circuit.

The line oscillator control circuit may include a line coincidence detector for determining when the line synchronizing pulses and the or the further reference signal occur simultaneously or not, the television receiver according to the invention being characterized in that the output of the line oscillator control circuit, when the pulses and signal do not occur simultaneously is applied for switching the field control stage to the external synchronization mode.

The field control stage may be adapted to be switched in operation from one synchronization mode to the other under the command of a mode selection circuit which also allows received field synchronizing pulses to be applied to the frequency divider circuit for the resetting thereof, said mode selection circuit being in the state for commanding the field control to be in the internal synchronization mode when the pulses applied to the field comparison stage have occurred simultaneously for a predetermined period, the television receiver according to the invention being characterized in that the mode selection circuit assumes the state for commanding the field control circuit to be in the external synchronization mode when the line synchronizing pulses and the or the further reference signal do not occur simultaneously.

Such a television receiver may be advantageously characterized in that the mode selection circuit, immediately after switching on of the receiver, is in the state for commanding the field control circuit to be in the external synchronization mode. The mode selection circuit may comprise a bistable element which receives set pulses from the field comparison stage when the given phase relationship in that stage has not existed for the predetermined period, the television receiver according to the invention being characterized in that the bistable element receives set pulses from the line oscillator control circuit when the phase between the line synchronizing pulses and the or the further reference signal departs from its given phase relationship. The television receiver according to the invention may be characterized in that the field control stage comprises a switch for applying either the received field synchronization pulses or a signal derived therefrom, or the divider pulses to the field output stage, said switch being controlled, in operation, by the output signal of said bistable element.

The invention also provides a synchronizing arrangement for use in the above television receiver and an integrated semi-conductor body incorporating the circuit components of such a synchronizing arrangement.

BRIEF DESCRIPTION OF THE DRAWING

The above and other features of the invention will be further explained by way of non-limitative example with reference to the accompanying drawing in which the sole FIGURE shows a block diagram of an embodiment of a television receiver according to the invention.

DESCRIPTION OF THE PREFERRED EMBODIMENT

In the Figure reference numeral 1 denotes an aerial by which a television signal can be received. This signal is applied to a signal section 2 in which it is amplified and processed for application in known way of the relevant signals to a picture display tube and a loudspeaker (not shown), respectively. A video signal is applied to a synchronization separation stage 3 at the output of which a composite synchronizing signal is present. This signal includes line synchronizing pulses having the line repetition frequency, i.e. for example, 15,625 or 15,750 Hz which are applied to an input terminal of an AND gate 4. The output signal of gate 4 is applied to a first phase discriminator 5, implemented as a controllable switch, whose output terminal is connected via a resistor 6 to a smoothing network 7 forming with resistor 6 a first low-pass filter. The line synchronizing signal is also applied to an input terminal of an AND gate 8 the output signal of which is applied to a second phase discriminator 9, also implemented as a controllable switch, whose output terminal is connected via a resistor 10 to network 7 forming therewith a modified (second) low-pass filter. The voltage produced in operation at network 7 is supplied to a voltage controlled line oscillator 11 for adjusting the frequency and/or phase thereof.

Oscillator 11 generates in the nominal case a sawtooth shaped signal having a frequency which is twice the line frequency. The sawtooth signal is applied to a pulse generator 12 by means of which it is converted into a pulse shaped signal whose leading edge occurs simultaneously with the rising edge of the sawtooth while the instant of occurrence of the trailing edge of the pulse is dependent on a voltage applied to generator 12 and generated in a manner still to be explained. The signal of generator 12 is applied to a frequency divider circuit 13 in which its frequency is divided by two and whose output signals therefore have the line frequency. One of the output signals of divider circuit 13 is applied as a reference signal to both switches 5 and 9 while another output signal of divider circuit 13 is applied to a driver and line output stage 14. Stage 14 supplies a line frequency current to the deflection coil, not shown, for the horizontal deflection in the picture display tube.

Line flyback pulses present in output stage 14, for example across a winding of a transformer thereof are applied to an input terminal of an AND gate 15 another input terminal of which is connected to the output terminal of divider circuit 13 supplying the reference signal. The output terminal of gate 15 is connected to an input terminal of an OR gate 16 whose output terminal is connected to an input terminal of gate 4 and to a controllable switch 17. A pulse generator 18 converts the signal of oscillator 11 into a pulse shaped signal having the line frequency and whose leading edge occurs simultaneously with a corresponding leading edge of the oscillator signal while the trailing edge occurs at an instant depending on a voltage applied to generator 18. The pulse signal produced by generator 18 is applied to another input terminal of gate 16. Switch 17 is a phase discriminator, it also being supplied with the reference signal from the relevant output terminal of divider circuit 13 and its output voltage is smoothed by a low-pass filter 19 which yields the voltage applied to pulse generator 12 and referred to above.

The line synchronizing and deflection circuit arrangement described so far has been described in greater detail in our U.S. Pat. No. 4,228,642 with, however, the exception of parts 8, 9 and 10. The circuit arrangement will be seen to include two control loops, with the result that the signal produced at the output terminal of gate 16 and applied to gate 4 includes a gate pulse for keying the line synchronizing pulses in such a way that phase discriminator 5 operates only during a small portion of the line period, the gate pulse being positioned in the steady state substantially symmetrically relative to an edge of the reference signal derived from the oscillator signal, while the adverse influence of phase variations occurring in output stage 14 and due to variations in the turn-off time of a switch comprised therein is substantially compensated for. To these ends the position of the leading edge of the gate pulse depends on this turn-off time whereas the position of the trailing edge depends on the voltage applied to generator 18, which voltage may be adjusted, or alternatively derived from the control voltage applied to oscillator 11.

Line flyback pulses originating from output stage 14 are also applied to an input terminal of a line coincidence detector 20, another input terminal thereof being supplied with the line synchronizing pulses from stage 3 and the output terminal being connected to an input terminal of AND gate 8. The function and the operation of this part of the line synchronizing circuit arrangement have been described in a slightly different embodiment in our co-pending U.S. Patent Application 727,714, now abandoned, U.S. Pat. No. 4,214,260 and the corresponding published Dutch Patent Application 751163.

When the synchronized condition of oscillator 11 has been attained only phase discriminator 5 is active. Because resistor 6 has a relatively high value the sensitivity thereof is low and the time constant of the first low-pass filter is formed by resistor 6 and network 7 is long. The phase discriminator 5 supplies a relatively small current to the filter. It is furthermore keyed by the output pulse from AND gate 4. These two circumstances ensure good noise immunity but would bring about a poor pull-in performance. If, however, coincidence detector 20 detects a non-synchronized condition, the second phase discriminator 9 is activated by the output signal of AND gate 8. Resistor 10 has a relatively low value so that phase discriminator 9 supplies a large current to the second low-pass filter formed by resistor 10 and network 7 and having a relatively short time constant. Since AND gate 8 does not receive gate pulses the operation of phase discriminator 9 is not keyed, that it is to say it operates during the whole line period. In these circumstances the loop again and hence the pull-in range is large and the control loop pulls in quickly, whereafter the limited range control by means of phase discriminator 5 only is brought into operation which is a keyed operation.

The output signal from line oscillator 11 is also applied to a frequency divider circuit 21 in which its frequency is divided by a number equal to the number of lines per image, for example, 625 or 525. When oscillator 11 has its nominal frequency after pulling-in in the frequency of the line synchronization circuit arrangement described above the frequency of the output signal of divider 21 is equal to the field frequency for the standard for which the television receiver is suitable, for example, 50 or 60 Hz. It follows from the foregoing that this situation is reached quickly, i.e. after a time period generally shorter than one field period which is equal to 20 or 16.7 ms.

The field synchronizing pulses contained in the composite synchronizing signal available at the output of the synchronization separation stage 3 are obtained in known manner by means of a field synchronization separation stage 22. It has yet to be ensured that the field frequency pulses obtained by means of divider 21 have a correct phase relationship with respect to the separated field synchronizing pulses present at the output terminal of stage 22. Both divider pulses and field synchronizing pulses are to this end applied to a field coincidence stage 23 the output terminal of which is connected to a counter 24. The output terminal of counter 24 is connected to an input terminal of an OR gate 25, another input terminal thereof being connected to the output terminal Q of a mode selection circuit 26. The field synchronizing pulses present at the output terminal of separation stage 22 are also applied to a field oscillator 27, to an input terminal of an AND gate 28 via a switch 32 controlled by the output signal from gate 25 and to an input terminal of circuit 26.

Field oscillator 27 is a free-running oscillator with a natural frequency which is lower than the field frequency. It is continuously triggered by the received field synchronizing pulses, its signal having thus the frequency and the phase of these pulses. This signal is applied to one of the selector contacts of a controllable switch 29, another selector contact thereof being connected to the output terminal of divider 21 while the master contact of switch 29 is connected to a field output stage 30. Stage 30 supplies a field frequency current to the deflection coil, not shown, for the vertical deflection in the picture display tube.

It is apparent from the foregoing that either the divider pulses or the field oscillator pulses are applied as a control signal to field output stage 30, depending on the position of switch 29. The operation from the divider pulses is referred to above as the internal synchronization mode, whereas the operation from the field oscillator pulses is referred to as the external synchronization mode. The position of switch 29 is controlled therefore by the output signal from OR gate 25. The output signal from switch 29 is also applied to a pulse generator 31 having two output terminals one of which is connected to an input terminal of AND gate 28 while the other is connected to an input terminal of circuit 26. Generator 31 can be triggered by the output signal from OR gate 25. The output terminal of AND gate 28 is connected to the reset terminal R of divider 21 and to an input terminal of circuit 26. Finally, the output terminal of line coincidence detector 20 is connected to an input terminal of circuit 26.

The field synchronizing and deflection circuit arrangement including the parts denoted by the reference numerals from 21 to 32 is similar to the arrangement described in our Patent Specification Ser. No. 1,445,456 with, however the exception of the above-mentioned connection between line coincidence detector 20 and mode selection circuit 26 which is not present in this published Patent Specification. The operation of the present arrangement without the above-mentioned connection is as follows:

Counter 24 counts the number of times that non-coincidence occurs between the pulses applied to coincidence stage 23. If non-coincidence occurs for a predetermined number of times, for example 16, after the in-phase condition has prevailed, counter 24 delivers a logic 1 to OR gate 25. Mode selection circuit 26 which can assume two states corresponding to the two synchronization modes of operation is still in the state corresponding to the internal synchronization mode, its output being a logic 0. In these circumstances, the output signal of OR gate 25 is a logic 1 which sets switch 32 into conduction and switch 29 into the position by which the pulses produced by oscillator 27 are supplied to output stage 30 (external synchronization). Pulse generator 31 generates two series of gating pulses both having a repetition rate equal to the field frequency divided by an integer, for example 16, each pulse having a duration of approximately one field period. The output signal from OR gate 25 is also applied to set generator 31 which therefore produces a first gating pulse and supplies it to AND gate 28. A synchronizing pulse occurs during the occurrence of the first gating pulse so that the output signal of AND gate 28 becomes logic 1 and resets divider 21 while it sets mode selection circuit 26 into the state corresponding to the external synchronization mode of operation, the output signal thereof becoming logic 1 and hence that of OR gate 25 remaining logic 1.

When the incoming television signal is a normal television transmission the in-phase condition remains unchanged within stage 23 during the subsequent field periods so that the output signal of counter 24 is logic 0. After a given number of field periods, for example 16, after the occurrence of the first gating pulse, a second gating pulse is produced by pulse generator 31 which pulse is applied to selection circuit 26. Coincidence of a divider pulse with a synchronizing pulse is established during the occurrence of the second gating pulse which sets mode selection circuit 26 into the state corresponding to the internal synchronization mode of operation, its output signal becoming logic 0. The output signal of OR gate 25 thus becomes logic 0 and drives switch 29 into the position by which the divider pulses originating from divider 21 are supplied to output stage 30 while switch 32 is opened so that the field synchronizing pulses are no longer applied to AND gate 28. Neither these pulses nor the following first gating pulse from generator 31 applied to AND gate 28 will thus have an influence on divider 21.

When the incoming television signal is not a normal television transmission signal a non-coincidence condition will be established by stage 23 and counter 24 during the occurrence of the second gating pulse. Mode selection circuit 26 remains thus in the state corresponding to the external synchronization mode of operation and the state of gates 25 and 28 as well as that of switches 29 and 32 remains unchanged. During the occurrence of the following first gating pulse, however, the output signal of AND gate 28 becomes logic 1 and resets divider 21 and a new cycle of 16 field periods begins after which it can be established whether the incoming signal is a normal signal or not.

After switching the receiver on mode selection circuit 26 is in the state corresponding to the external synchronization mode of operation either immediately or after 16 field periods. Its output signal and hence that of OR gate 25 is a logic 1. Switch 32 conducts while the pulses produced by oscillator 27 are supplied via switch 29 to output stage 30. Generator 31 is triggered to produce a first gating pulse during the occurrence of which the output signal of AND gate 28 is changed into logic 1 and resets divider 21. A coincidence condition then occurs in stage 23 whereafter the arrangement is switched as above during the occurrence of the following second gating pulse into the internal synchronization mode of operation if the received television signal is a normal signal.

If no field synchronizing pulses are available at the output terminal of separation stage 22 for some reason, for example, because of noise and/or interference, no coincidence will occur in stage 23 and a logic 1 will be applied to OR gate 25 after a time delay determined by counter 24 with the result that the arrangement will be brought into the external synchronization mode of operation, divider 21 being reset during the occurrence of each first gating pulse. The arrangement is thus ready to operate normally in case the synchronizing pulses reappear, while field oscillator 27 oscillates freely at its natural frequency, causing the displayed image, if any, to "roll over" in the vertical direction as long as no synchronizing pulses are present.

Before the above-mentioned delay has been completed, however, the arrangement will stay in the state it assumed before the synchronizing pulses dropped out, i.e. the divider pulses will be applied to field output stage 30 if the arrangement operates in the internal synchronization mode. The same may happen as a consequence of a phase jump occurring in the field synchronization pulses, for example, after a channel change in the receiver or a camera switch over in the transmission studio, which will cause, as stated in the preamble, a horizontal black bar to be displayed on the screen of the picture tube until counter 24 delivers a logic 1, which introduces the external synchronization mode of operation. The purpose of the connection between line coincidence detector 20 and mode selection circuit 26 is to shorten the delay referred to without adversely influencing the noise immunity properties offered thereby.

During normal synchronized operation, line coincidence detector 20 does not apply a signal to AND gate 8 or to mode selection circuit 26. If, however, a phase jump occurs as stated above in the field synchronizing pulses sequence, it is clear that a similar jump will most probably also occur in the line synchronizing pulses. A non-coincidence condition is consequently detected by means of line coincidence detector 20, which switches on the wide range phase discriminator 9 for readjusting the line synchronization circuit arrangement while a signal is applied to mode selection circuit 26 causing the output signal thereof to assume the value logic 1 irrespective of the phase difference existing in coincidence stage 23. If at this time less than 16 consecutive noncoincidence conditions have been detected by means of field coincidence stage 23 and counter 24 the output signal of the counter 24 will be logic 0. That of gate OR 25 will nevertheless be logic 1 which causes the external synchronization mode of operation to be introduced and divider circuit 21 to be reset, while the gating pulses sequence is being started. After a relatively short time the line synchronization loop attains its synchronized condition in which line coincidence detector 20 detects coincidence which switched off the operation of the wide range control by means of phase discriminator 9 while no information is sent to mode selection circuit 26 which thus remains in its state corresponding to the external synchronization mode of operation. This situation remains unchanged until the occurrence of the following second gating pulse during which the decision will be taken as above whether the field synchronization circuit arrangement has to be switched to the internal mode of operation or not.

It will be observed that after switching the receiver on i.e. in a situation in which neither synchronization circuit arrangement has yet attained the synchronized condition, mode selection circuit 26 has to be in the arrangement of the drawing in the state corresponding to the external synchronization mode of operation, i.e. its output signal is logic 1. A command originating from line coincidence detector 20 as described above has therefore no influence on the field synchronization circuit arrangement. If during normal reception one or more field synchronizing pulses are lost, for example because they cannot be distinguished from noise, while the line synchronizing pulses are normally received and processed, then one or more non-coincidence conditions will be detected by stage 23 and counted by counter 24 without line coincidence detector 20 exerting an influence on this operation. It is apparent from the foregoing that the delay introduced by counter 24 which is necessary to obtain satisfactory noise immunity is maintained whereas it is substantially reduced whenever it would be detrimental. If the opposite situation occurs, i.e. if some line synchronizing pulses are missing while the reception of field synchronizing pulses are satisfactory, the frequency of line oscillator 11 and hence that of the divider pulses will change. The signal supplied to field output stage 30 will, however, have the proper field frequency because line coincidence detector 20 forces almost immediately the field synchronization circuit arrangement to operate in the external synchronization mode of operation.

Line coincidence detector 20 is not the only place in the line oscillator control circuit from which a command can be sent to mode selection circuit 26 with the purpose of reducing the delay introduced by counter 24. When non-coincidence exists in coincidence detector 20 a large current is supplied to network 7 and causes a large ripple voltage to be present thereat. This voltage which is substantially reduced in the line in-phase condition can be used for the command referred to. The same can also be done in case the operation of the line oscillator control circuit is not keyed by gate pulses.

One advantage of the connection to mode selection circuit 26 is that use is made of components in an existing integrated circuit, for example of the Mullard type TDA 2576. It could be, however, be utilized in other arrangement, i.e. not comprising such a mode selection circuit. The connection from either line coincidence detector 20 or network 7 could, for example, be connected to switches 29 and 32 with a similar result.

It will be evident that some of the features described in the foregoing are not essential for the invention. A line oscillator having the line frequency, for example, could be used for oscillator 11, divider 21 the dividing by a number equal to 312.5 or 262.5, respectively, or, alternatively, a multiplication by 2 being effected prior to the division by 625 or 525, respectively. Similarly, the free-running oscillator 27 could be included between switch 29 and field output stage 30, this oscillator being then synchronized either by the received field synchronizing pulses or by the divider pulses through the switch 29. Such an arrangement is actually described in our Patent Specification Ser. No. 1,445,456 referred to above in which, moreover, the divider is not immediately reset when the arrangement is switched to the external synchronization mode of operation, this being due to the fact that the pulse generator similar to generator 31 in the present application is not triggered by the output signal of the gate similar to the present OR gate 25.

The drawing includes an embodiment of mode selection circuit 26. An AND gate 33 receives the second gating pulses generated by generator 31, the separated field synchronizing pulses from stage 22 and the pulses originating from divider circuit 21. The output terminal of gate 33 is connected to the reset terminal of a flipflop 34 whose Q output terminal is connected to an input terminal of OR gate 25. The output signals of AND gate 28 and line coincidence detector 20 are applied to respective input terminals of an OR gate 35 whose output terminal is connected to the set terminal of flip-flop 34. It will readily be recognized that circuit 26 realized in this way can fulfil the functions described, i.e., it is reset (Q=0) if the input signals of AND gate 33 coincide and it is set (Q=1) of either input signal of OR gate 35 is present. Line coincidence detector 20 is not described in detail since such devices are well known in the art. Our Patent Specification Ser. No. 1,512,045 shows a possible embodiment thereof.

What is claimed is:

1. A television receiver suitable for the reception of a television signal incorporating line and field synchronizing pulses, a plurality of fields constituting an image, the receiver including a synchronizing arrangement which comprises:

a line oscillator for generating in the synchronized condition thereof a signal having a frequency equal to the line frequency or to an integral multiple thereof, a line oscillator control circuit, means for applying received line synchronizing pulses and a reference signal derived from the line oscillator signal to said line oscillator control circuit which is adapted to produce a control signal depending on the phase relationship between said line synchronizing pulses and said reference signal for controlling the frequency and/or phase of said line oscillator, a frequency divider circuit connected to said line oscillator for producing pulses of field frequency from said line oscillator signal, a field comparison stage, means for applying received field synchronizing pulses and pulses produced by said frequency divider circuit to said field comparison stage for comparing the phase of said received pulses with that of the divider pulses, means for determining the time during which a given phase relationship does not exist in said comparison stage between the pulses compared therein, means for applying received field synchronizing pulses to said frequency divider circuit for the resetting thereof, a field deflection output stage, a field synchronization control stage connected to said field deflection output stage, said field control stage being switchable between an external synchronization operating mode in which it is adapted to apply in operation the received field synchronization pulses or a signal derived therefrom to the field output stage and an internal synchronzation operating mode in which it is adapted to apply in operation the divider pulses to the field output stage, said field control stage being adapted to be switched from said external to said internal synchronization mode when the given phase relationship in said field comparison stage has existed for a predetermined period while said field control stage is adapted to be switched from said internal to said external synchronizaton mode when said given phase relationship has not existed for said predetermined period, a received field synchronizing pulse being then allowed to be applied to the frequency divider circuit for the resetting thereof, wherein said field control stage is also adapted to be switched from the internal to the external synchronization mode under the control of the line oscillator control circuit when the phase between the line synchronizing pulses and or a further reference signal also derived from the line oscillator signal departs from a given phase relationship.

2. A television receiver as claimed in claim 1, when said field control stage is switched to said external synchronization mode under the control of said line oscillator control circuit a received field synchronizing pulse is applied to said frequency divider circuit for the resetting thereof.

3. A television receiver as claimed in claim 1 or 2 in which said line oscillator control circuit includes a line coincidence detector for determining when line synchronizing pulses and the or the further reference signal occur simultaneously or not, the output of said line oscillator control circuit, when the pulses and signal do not occur simultaneously switches the field control stage to the external synchronization mode.

4. A television receiver as claimed in claim 1 or 2, in which said line oscillator control circuit includes a line phase discriminator to which said line synchronizing pulses and said reference signal are adapted to be applied and a low-pass filter for smoothing the output voltage of the line phase discriminator which voltage forms the control signal for the line oscillator, characterized in that said voltage is also adapted to perform the switching of the field control stage to the external synchronization mode.

5. A television receiver as claimed in claims 1 in which the field control stage is adapted to be switched in operation from one synchronization mode to the other under the command of a mode selection circuit which also allows received field synchronizing pulses to be applied to the frequency divider circuit for the resetting thereof, said mode selection circuit being in the state for commanding the field control circuit to be in the internal synchronization mode when the pulses applied to the field comparison stage have occurred simultaneously for a predetermined period, characterized in that the mode selection circuit assumes the state for commanding the field control circuit to be in the external snchronization mode when the line synchronizing pulses and the or the further reference signal do not occur simultaneously.

6. A television receiver as claimed in claim 5, characterized in that the mode selection circuit, immediately after switching on of the receiver, is in the state for commanding the field control circuit to be in the external synchronization mode.

7. A television receiver as claimed in claim 5 in which the mode selection circuit comprises a bistable element which receives set pulses from the field comparison stage when the given phase relationship in that stage has not existed for the predetermined period, characterized in that the bistable element receives set pulses from the line oscillator control circuit when the phase between the line synchronizing pulses and the or the further reference signal departs from its given phase relationship.

8. A television receiver as claimed in claim 7, characterized in that the field control stage comprises a switch for applying either the received field synchronization pulses or a signal derived therefrom, or the divider pulses to the field output stage, said switch being controlled, in operation, by the output signal of said bistable element.

9. A synchronizing arrangement as claimed in claim 1, characterized in that the circuit components of said arrangement, with the exception of large value capacitors, are integrated in a semi-conductor body.

10. An integrated semi-conductor body incorporating the circuit components as claimed in claim 9.

* * * * *

UNITED STATES PATENT AND TRADEMARK OFFICE
CERTIFICATE OF CORRECTION

PATENT NO. : 4,319,276
DATED : March 9, 1982
INVENTOR(S) : ADRIAAN CENSE ET AL

It is certified that error appears in the above—identified patent and that said Letters Patent is hereby corrected as shown below:

```
Claim 3, line 4 delete "the" (first occurrence)
Claim 5, line 1 change "Claims" to --Claim--
         after "1" insert --,--
         line 15 delete "the" (first occurrence)
Claim 7  line 1 after "5" insert --,--
         line 8 delete "the" (second occurrence)
```

*Signed and Sealed this*

*Twenty-first* Day of *September 1982*

[SEAL]

Attest:

GERALD J. MOSSINGHOFF

*Attesting Officer*

*Commissioner of Patents and Trademarks*